United States Patent [19]

Martinson et al.

[11] 4,011,648

[45] Mar. 15, 1977

[54] BEARING PULLER DEVICE

[76] Inventors: Milton Martinson; Ernest C. Michelson, both of Ashby, Minn.

[22] Filed: Dec. 22, 1975

[21] Appl. No.: 643,310

[52] U.S. Cl. .......... 29/264

[51] Int. Cl.$^2$ .......... B23P 19/04

[58] Field of Search .......... 29/258–266

[56] References Cited

UNITED STATES PATENTS

| | | | |
|---|---|---|---|
| 1,589,015 | 6/1926 | Lee | 29/261 |
| 2,052,534 | 8/1936 | Quarles | 29/261 |
| 3,358,352 | 12/1967 | Wilcox | 29/263 |
| 3,727,293 | 4/1973 | Phillips | 29/264 |
| 3,748,718 | 7/1973 | Russell | 29/264 |

*Primary Examiner*—James L. Jones, Jr.

*Attorney, Agent, or Firm*—Williamson, Bains & Moore

[57] ABSTRACT

A bearing puller includes a pair of slotted semi-cylindrical sleeve elements which may be clamped over a bearing race mounted on a shaft. The sleeve elements are provided with inwardly projecting radial flanges at opposite ends, which are engageable in the annular groove of the bearing race. A cylindrical sleeve retains the sleeve elements in clamped relation with respect to the bearing race, and a pulling tool engages in the slots of the sleeve elements to permit the bearing race to be forceably pulled from the shaft.

3 Claims, 4 Drawing Figures

BEARING PULLER DEVICE

SUMMARY OF THE INVENTION

This invention relates to a bearing puller and specifically to a bearing puller which is used in removing the inner bearing race from mounted relation on a shaft.

It is an object of this invention to provide a novel bearing puller device which may be readily applied to the bearing race of the type used in agricultural implements and which is operable to effectively remove the bearing race from mounted relation on a shaft.

A more specific object of this invention is the provision of a bearing puller device comprised of a pair of semi-cylindrical sleeve elements with inturned flanges at opposite ends that are selectively engageable in the annular groove of a bearing race, the sleeve elements being slotted to permit gripping thereof by the pulling tool to permit the bearing race to be forceably removed from mounted relation on a shaft.

These and other objects and advantages of this invention will more fully appear from the following description made in connection with the accompanying drawings, wherein like reference characters refer to the same or similar parts throughout the several views.

FIGURES OF THE DRAWING

DESCRIPTION OF THE PREFERRED EMBODIMENT

Figure 1:
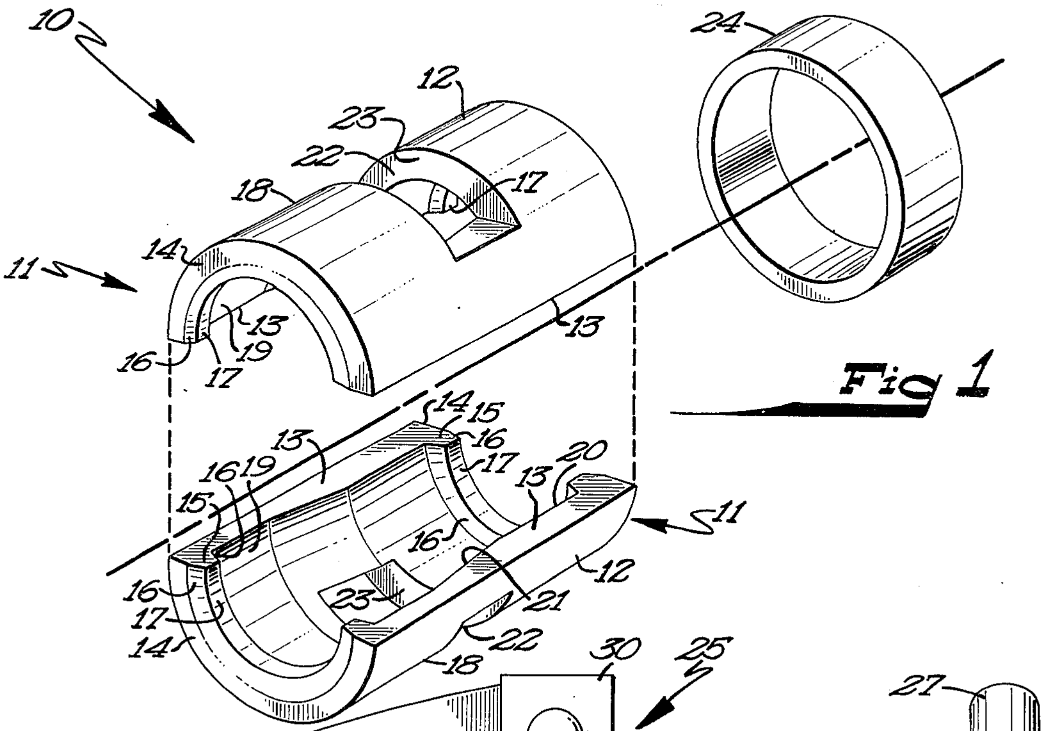
FIG. 1 is an exploded perspective view of the clamping sleeve elements and retaining collar.
Figure 2:
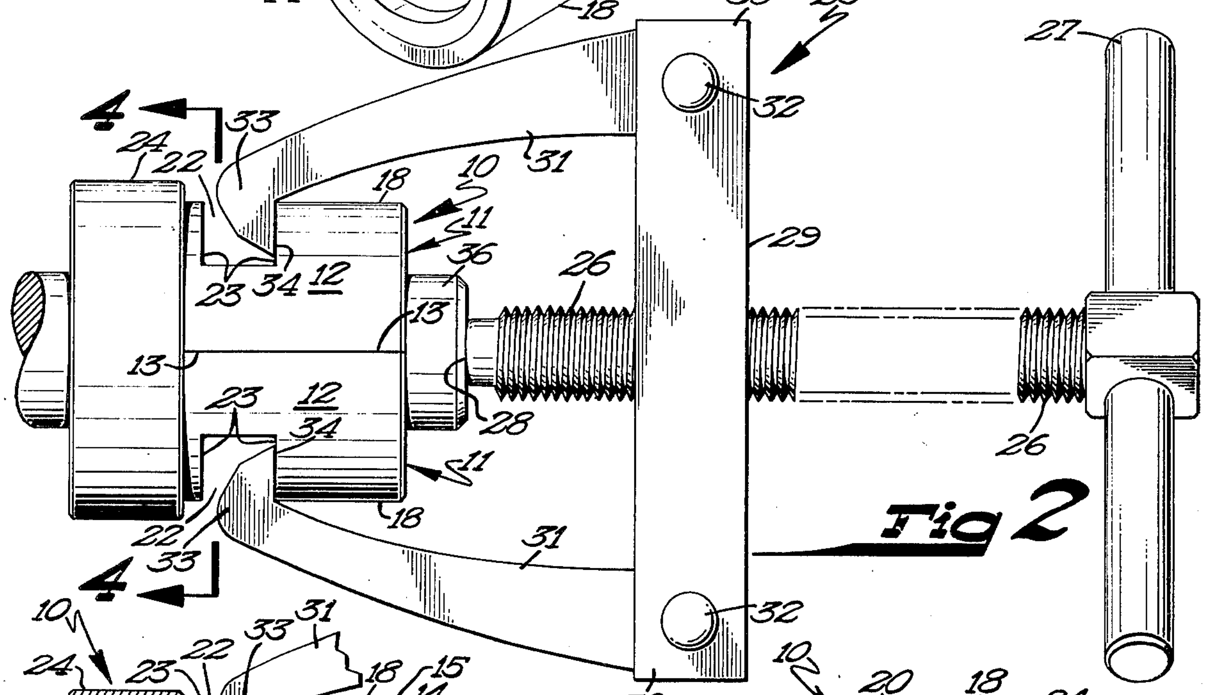
FIG. 2 is a perspective view of the bearing puller device applied in clamping relation to the inner-ball bearing race mounted on a shaft.

Referring now to the drawings and more specifically to FIG. 2, it will be seen that one embodiment of the novel bearing pulling device 10 is thereshown. The bearing pulling device 10 is comprised of a pair of substantially identical clamping sleeve elements 11, each being of semi-cylindrical configurations and each being formed of a suitable metallic material. Each sleeve element is comprised of an arcuate wall 12 having substantialy straight elongate flat longitudinal edges 13 and having substantially flat arcuate end edges 14.

Each sleeve element 11 is also provided with a pair of arcuate inwardly projecting flanges 15, each flange being located at one end of the associated sleeve element.

Figure 3:
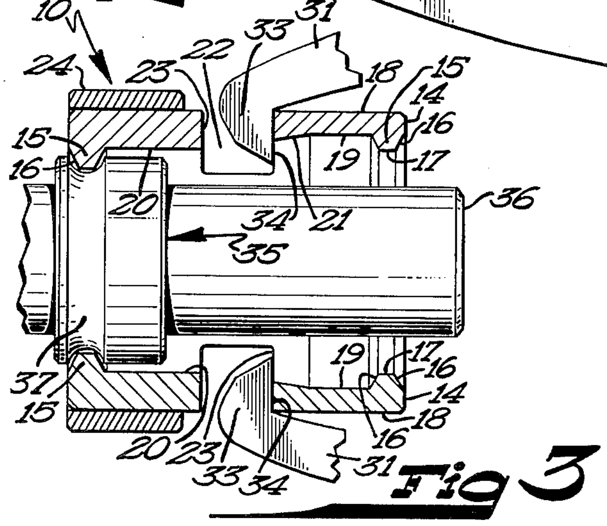
FIG. 3 is a side view partly in section and partly in elevation of the bearing puller device applied to a bearing race mounted on a shaft.
Figure 4:
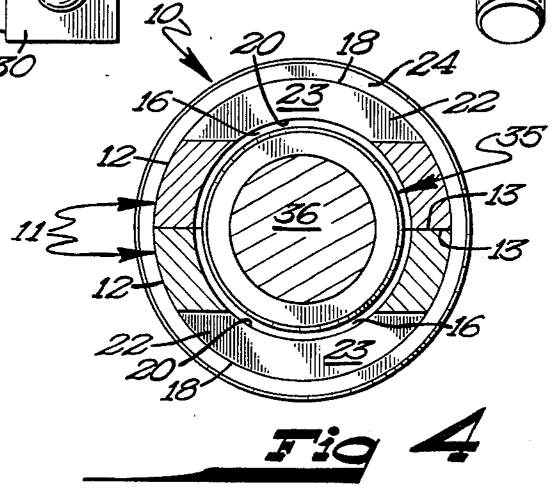
FIG. 4 is a cross-sectional view taken approximately along Line 4—4 of FIG. 3 and looking in the direction of the arrows.

Referring now to FIG. 3, it will be noted that each of the flanges 15 is of trapezoidal cross-sectional configuration and includes converging surfaces 16 that terminate in an inner annular flange surface 17. It is pointed out that the radius defining the flange surface 17 at one end of each sleeve element is greater than the radius defining the other flange element. With this arrangement, the clamping sleeve elements can accommodate bearing races of different size.

It will be noted that each sleeve element 11 has an outer cylindrical surface 18 and an inner surface. The inner surface includes an inner cylindrical end surface portion 19 and an inner cylindrical end surface portion 20 interconnected by an intermediate surface portion 21 which is of frusto-conical configuration. Each sleeve element 11 has an elongate circumferentially extending slot 22 therein having circumferentially extending substantially flat edges 23, the edge 23 lying in a radial plane.

The clamping sleeve elements 11 are adapted to be clamped over an inner bearing race so that the longitudinal edges of the clamping sleeve elements abut each other. When disposed in edge abutting relation, the clamping sleeve elements form a cylinder and the slots 22 are disposed in diametrically opposed relation with respect to each other.

Means are provided for retaining the sleeve elements in abutting relation and to this end, a rigid cylindrical metallic collar 24 is provided and engages the outer cylindrical surface 18 of the abutting sleeve elements. Means are also provided for engaging the abutting sleeve elements 11 when the latter are disposed in clamping relation with a bearing race to permit the bearing race to be pulled forceably from mounted relation on a shaft. This means includes a pulling tool 25 which is comprised of an elongate threaded member or shank 26 having a rigid handle 27 affixed at one end and projecting laterally therefrom. The outer end of the shank 26 defines a flat surface 28 which is adapted to engage the flat end surface of the shaft upon which the bearing race is mounted. The pulling tool 25 also includes a threaded nut 29 having ears 30 affixed thereto and projecting laterally from opposite ends thereof. It will be noted that the ears 30 are arranged in pairs and are appertured to receive pivots 32, each pivot 32 pivotally mounting an elongate gripping member 31 between the ears 30. It will therefore be seen that the gripping members 31 are mounted on the nut 29 for pivotal movement relative thereto. Each gripping member 31 has an inturned outer end 33 having a substantial flat engaging surface 34 for engagement with the edge 23 of one of the slots 22.

In use, the clamping sleeve elements 12 are positioned over the cylindrical inner bearing race 35 so that the longitudinal edges 13 of the sleeve elements are disposed in abutting relationship with each other. The flanges 15 at one end of each sleeve element will engage in the annular groove 37 of the bearing race as best seen in FIG. 3. It will be noted that the trapezoidal cross-sectional shape of the flanges 15 permits the flanges to be snugly accommodated in the groove 37 of the bearing race. Thereafter, the rigid metallic collar 24 will be slipped over the sleeve elements so that one edge of the collar 24 is disposed in coplanar relation with the inner end of the sleeve elements 11, and the shank 26 is positioned in abutting relation with the end surface 28 of the shaft 36. The gripping members 31 are positioned in the slots 22 and the threaded shank is rotated to shift the nut 29 axially away from the shaft 36 until the gripping members 31 tighten against the circumferential edges 23. Thereafter, the pulling tool may be given a sharp rap with a hammer or the like which will free the inner race from gripped relation with respect to the shaft 36. It is pointed out that the sleeve elements 11 may be turned end for end to accommodate different size bearing races.

As pointed out above, the bearing pulling device is especially adaptable for use in removing the inner race of sealed bearings of the type used in agricultural implements. The slotted sleeve elements permits the bearing pullling device to be readily applied to the bearing race and also permits ready application of the pulling tool to the sleeve elements.

From the foregoing description, it will be seen that I have provided a novel bearing pulling device which is not only of simple and inexpensive construction, but one which is more efficient than any heretofore known comparable device.

We claim;

1. A bearing puller device for use in forceably pulling an inner bearing race sleeve from eccentric engaging relation with a shaft, the bearing having an annular groove therein, said bearing puller device comprising a pair of semi-cylindrical sleeve elements having elongate straight longitudinal edges, and adapted to be positioned around and in clamping relation with the inner race of a bearing, the longitudinal edges of the sleeve elements engaging each other when the sleeve elements are disposed in clamping relation with the bearing race, each sleeve elements having a pair of arcuate flanges, each flange extending rigidly inwardly from one end of the associated sleeve element, the radius of the flange at one end of each sleeve element being greater than the radius of the flange at the other end, the flange at one end of each sleeve element engaging in the groove of the bearing when the sleeve elements are disposed in clamping relation with the bearing race, a rigid cylindrical collar being dimensioned to slide over and engage the exterior surface of the sleeve elements for retaining the latter in clamped relation with the bearing race, each sleeve element having an elongate slot therein extending circumferentially thereof, said slots being disposed in diametrically opposed relation with respect to each other, and a pulling tool including an elongate handle, a pair of elongate gripping members adapted to engage in the slots of the sleeve elements to thereby grip the sleeve elements, and means interconnecting the gripping members with a handle whereby when the gripping members are moved longitudinally of the handle, the inner race of the bearing will be disengaged from mounted relation on the shaft.

2. The bearing puller device as defined in claim 1 wherein card slots each define a substantially flat surface disposed in a radial plane and being engaged by a gripping member of the pulling tool.

3. The bearing puller device as defined in claim 1 wherein said flanges on said sleeve elements are of trapezoidal cross-sectional shape.

* * * * *